United States Patent [19]

Redshaw

[11] 4,107,481

[45] Aug. 15, 1978

[54] TELEPHONE INSTRUMENTS

[75] Inventor: Digby Redshaw, Warwick, England

[73] Assignee: The Post Office, London, England

[21] Appl. No.: 785,559

[22] Filed: Apr. 7, 1977

[30] Foreign Application Priority Data

Apr. 13, 1976 [GB] United Kingdom .............. 15091/76

[51] Int. Cl.² ............................................. H04M 1/08
[52] U.S. Cl. ................................. 179/164; 179/100 C
[58] Field of Search ................... 179/100 C, 159, 164, 179/165

[56] References Cited

U.S. PATENT DOCUMENTS 2,762,869  9/1956  Huizenga et al. .................... 179/159

FOREIGN PATENT DOCUMENTS 1,134,715  8/1962  Fed. Rep. of Germany ....... 179/100 C Primary Examiner—William C. Cooper
Attorney, Agent, or Firm—Kemon & Estabrook

[57] ABSTRACT

The invention relates to a switching device for energizing and de-energizing a telephone instrument in response to removal and replacement of the handset. The device comprises a platform for receiving a capsule of the handset, the said platform being pivotal against a bias. The weight of the handset moves the platform to de-energize the device when the handset is in position on the instrument. The arrangement has the characteristic that secure location of the platform is provided whether the instrument is in the horizontal or the vertical mode.

1 Claim, 4 Drawing Figures

TELEPHONE INSTRUMENTS

This invention relates to telephone instruments. It is a conventional in a telephone instrument to support the hand-set on a cradle mounted for vertically reciprocable movement on the instrument body. When the hand-set rests in the cradle, the latter moves to a lower position at which a switching arrangement de-energises the instrument; on removal of the hand-set the cradle moves upwardly under a suitable bias to an upper position at which the switching arrangement energises the instrument.

In accordance with the present invention a switching device for energising and de-energising a telephone instrument in response to removal and replacement of the hand-set comprises a platform for receiving one capsule of the hand-set, a pivotal support permitting movement of the platform in response to the capsule being placed thereon and biassing means opposing the said movement. The platform is so configurated and the pivotal support so arranged that placing the receiver on the instrument, either in the horizontal (desk mounted), or the vertical (wall mounted) mode, with the capsule on the platform provides secure location of the hand-set and causes the same pivoting movement of the support against the biassing means.

Switching means which energise the instrument when the platform and pivotal support are moved by the weight of the hand-set and which energise the instrument when the platform and pivotal support are restored by the bias are operated by a moving part either of the support or of the platform.

A device in accordance with an embodiment of the invention comprises a platform for receiving the capsule of a hand-set, an abutment projecting from the plane of the platform to provide a location for the capsule, at least two linkages each having a part pivotally connected to the platform, a pivotal support for each linkage, the axes of all the pivots being parallel to one another and the platform and linkages being movable against spring bias from a first position to a second position by the gravity bias of the hand-set with the capsule on the platform.

In the horizontal mode of the instrument the capsule bears directly on the platform whilst in the vertical mode the capsule bears against adjacent surfaces of the platform and the abutment, the resolved component of the forces arising from these bearing loads rotating the two pivoted linkages in the same sense as the simple gravity load. In both instances, movement in one sense causes the platform to move laterally and downwardly in a swinging motion.

A specific embodiment of the invention will now be described by way of example and with reference to the accompanying drawing wherein.

Figure 1:
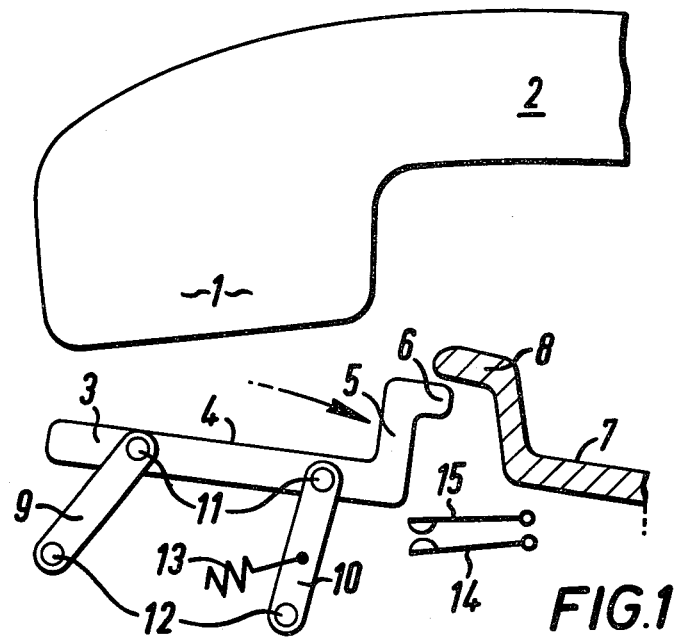
FIG. 1 shows diagrammatically, in the desk top mode, a device in accordance with the invention with the capsule of a telephone hand-set just removed therefrom.

Referring initially to FIG. 1 of the drawings the capsule 1 of a telephone hand-set 2 is illustrated immediately above the switching device in accordance with the particular embodiment. The switching device comprises a generally L-shaped platform member 3 with an upper flat capsule-receiving surface 4 positioned at a slight angle inclined to the horizontal. An upstanding abutment member 5 extends from the lower end of the platform and terminates in a nib 6. The instrument casing 7 has an eave structure 8 under which the nib 6 is located. The upper end parts of first and second pivot strips 9 and 10 are pivotally secured to the plat form 4 about horizontal axes 11. The lower end parts of the pivot strips 9 and 10 are also pivotally mounted about horizontal axes 12, the axes 11 and 12 being all parallel to one another. A tension spring 13 resists clockwise pivoting motion of the strip 10 and hence of the strip 9 and the platform 3.

Figure 2:
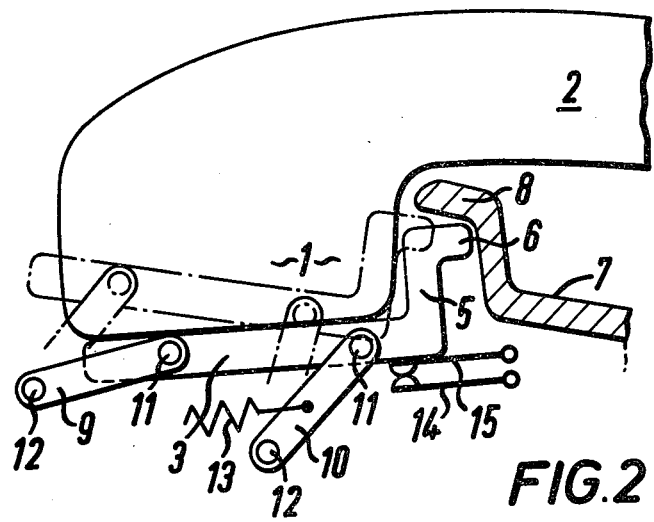
FIG. 2 shows the device of FIG. 1 with the capsule on the platform and the hand-set on the instrument.

When the capsule 1 is placed on the platform 3 as shown in FIG. 2 the strips 9 and 10 pivot in a clockwise sense and the platform moves downwardly and to the right in the illustrated swinging motion.

Figure 3:
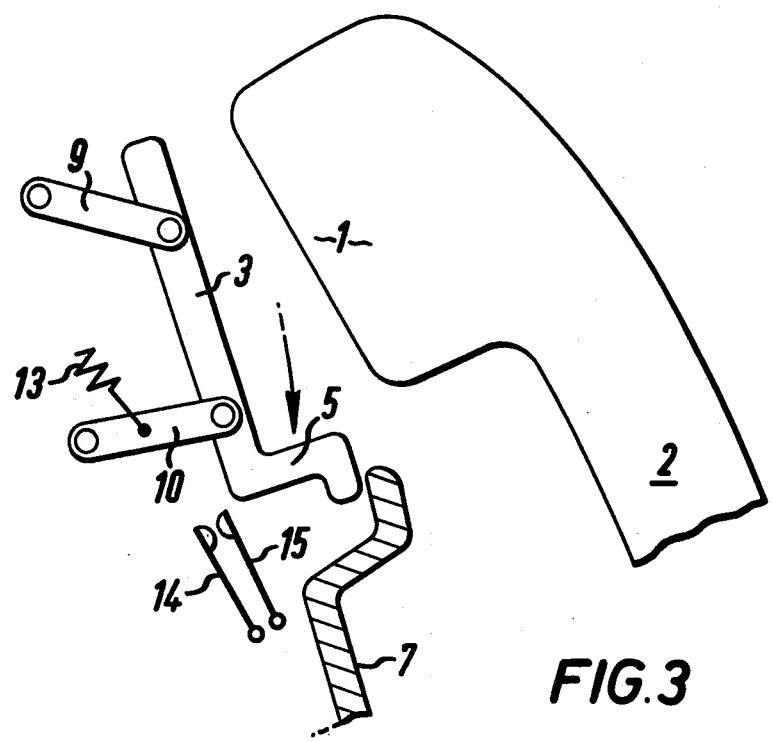
FIGS. 3 and 4 are views corresponding to FIGS. 1 and 2 but showing the instrument in the wallmounted mode.
Figure 4:
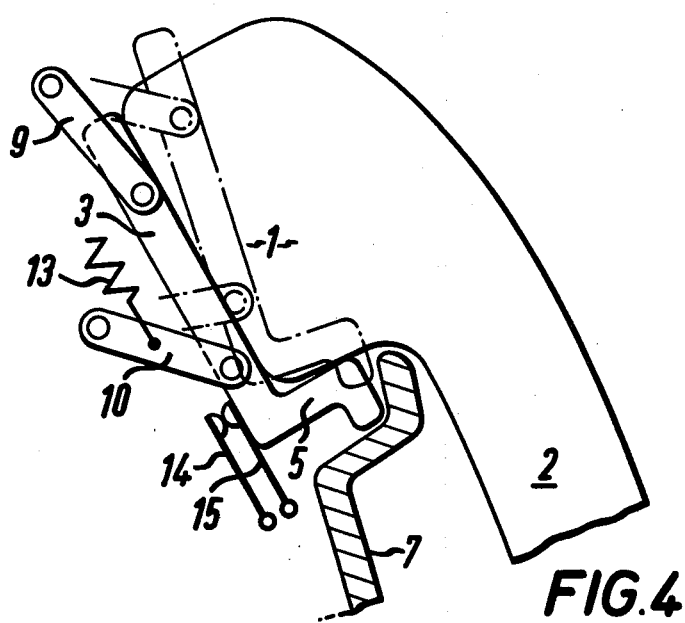

Referring now to FIGS. 3 and 4 it will be noted that when the capsule 1 is placed on the platform 3 in the wall mounted mode of the instrument the lower part of the capsule rests in the cradle defined between the adjacent surfaces of the platform 3 and abutment 5 the force developed generates clockwise motion of the linkages and platform in the same clockwise sense as illustrated in FIG. 2.

An electrical switching mechanism, schematically shown as contacts 14 and 15 normally biassed to an open position is controlled by one of the moving parts of the device to energise the instrument when the conditions shown in FIGS. 1 and 3 prevail and to de-energise the instrument when the conditions shown in FIGS. 2 and 4 prevail. More specifically when the conditions shown in FIGS. 2 and 4 prevail the undersurface of platform member 4 adjacent the lower end thereof abuts contact 15 and holds it abutting electrically conductive relationship with contact 14 thereby closing a circuit to de-energise the instrument.

I claim:

1. A switching device for energizing and de-energizing a telephone instrument in response to removal and replacement of the hand-set, comprising a platform for receiving one capsule of the hand-set, an abutment projecting from the plane of the platform providing a location for the capsule and including at least two linkages each having a part pivotally connected to the platform, a pivotal support for each linkage, the axis of all the pivots being parallel to one another and the platform and the linkages being movable against spring bias from a first position at which the instrument is energized, to a second position at which the instrument is de-energized, by the gravity bias of the hand-set with the capsule on the platform, the arrangement being that placing the hand-set on the instrument either in the horizontal or the vertical mode with the capsule on the platform provides secure cradled location of the hand-set and causes movement of the linkages to the second position.

* * * * *